US009125467B2

(12) United States Patent
Randel et al.

(10) Patent No.: US 9,125,467 B2
(45) Date of Patent: Sep. 8, 2015

(54) CANOPY ASSEMBLY ORGANIZER

(71) Applicant: Advanced Promotional Technologies, Inc., Acworth, GA (US)

(72) Inventors: Michael D. Randel, Acworth, GA (US); Jennifer B. Randel, Acworth, GA (US)

(73) Assignee: ADVANCED PROMOTIONAL TECHNOLOGIES, INC., Acworth, GA (US)

( * ) Notice: Subject to any disclaimer, the term of this patent is extended or adjusted under 35 U.S.C. 154(b) by 0 days.

(21) Appl. No.: 14/340,448

(22) Filed: Jul. 24, 2014

(65) Prior Publication Data

US 2015/0028173 A1 Jan. 29, 2015

Related U.S. Application Data

(60) Provisional application No. 61/858,061, filed on Jul. 24, 2013.

(51) Int. Cl.
*A47F 5/08* (2006.01)
*A45C 11/26* (2006.01)
*E04H 15/32* (2006.01)
*F16M 13/02* (2006.01)

(52) U.S. Cl.
CPC .............. *A45C 11/26* (2013.01); *E04H 15/32* (2013.01); *F16M 13/022* (2013.01)

(58) Field of Classification Search
CPC ............ E02D 5/60; A01G 17/12; B25H 3/00; E06C 7/14; A47C 5/05; F16M 13/02; F16M 13/022; A45C 11/26

USPC ................ 206/373, 349; 182/129; 383/9, 38; 211/87.01, 13.1, 85.2, 85.9, 69.1, 70.1, 211/70.6, 70.7, 86.01, 113, 118; 248/218.4, 248/219.1, 219.2

See application file for complete search history.

(56) References Cited

U.S. PATENT DOCUMENTS

| 3,448,585 | A | * | 6/1969 | Vogelsang | 405/216 |
|---|---|---|---|---|---|
| 3,782,724 | A | * | 1/1974 | Rottman et al. | 267/140 |
| 4,765,472 | A | * | 8/1988 | Dent | 206/373 |
| 5,117,724 | A | * | 6/1992 | Gardner | 84/421 |
| 5,408,782 | A | * | 4/1995 | McConnell | 182/187 |
| 5,518,342 | A | * | 5/1996 | Wright et al. | 405/211 |
| 5,664,673 | A | * | 9/1997 | Perry | 206/371 |
| 6,152,300 | A | * | 11/2000 | Perkins | 206/373 |
| 6,928,950 | B2 | * | 8/2005 | Trammell et al. | 114/382 |
| 7,048,162 | B2 | * | 5/2006 | Frye et al. | 224/222 |
| 7,273,148 | B2 | * | 9/2007 | Perry et al. | 206/750 |
| 2004/0231251 | A1 | * | 11/2004 | Ward | 52/40 |

* cited by examiner

*Primary Examiner* — Korie H Chan
(74) *Attorney, Agent, or Firm* — Howard & Howard Attorneys PLLC

(57) ABSTRACT

A canopy organizer for organizing objects on an elongated and vertical support is provided. The organizer comprises a first fabric wall and a second fabric wall. Both walls are in contact with each other along the edges so as to form a pocket. Then, a filling is within the pocket formed by the first and second nylon walls and a flap is attached to the first wall along the length of the cover. The flap is configured to interface with a determined area along the opposite edge of the nylon wall. The organizer includes at least one fastener configured to hold the cover around a cylindrical object, wherein one of the two walls is an outside wall and the other is the inside wall. A plurality of attachment elements are attached to the outside wall.

13 Claims, 4 Drawing Sheets

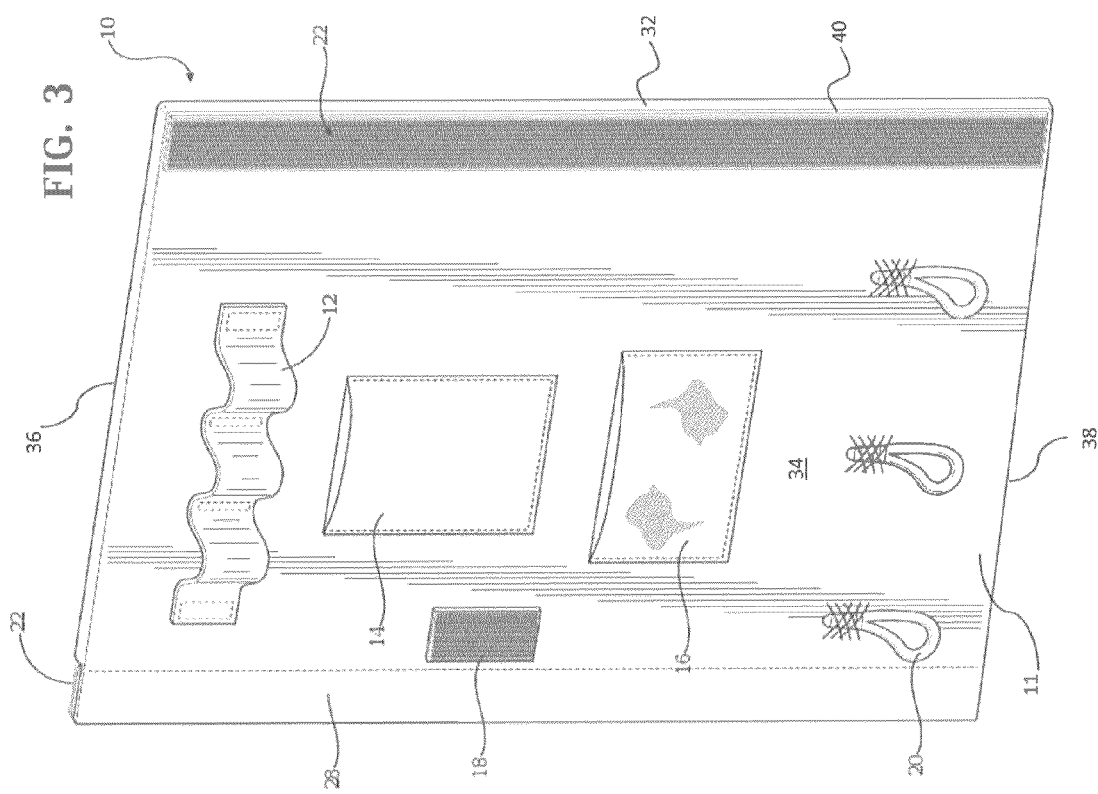

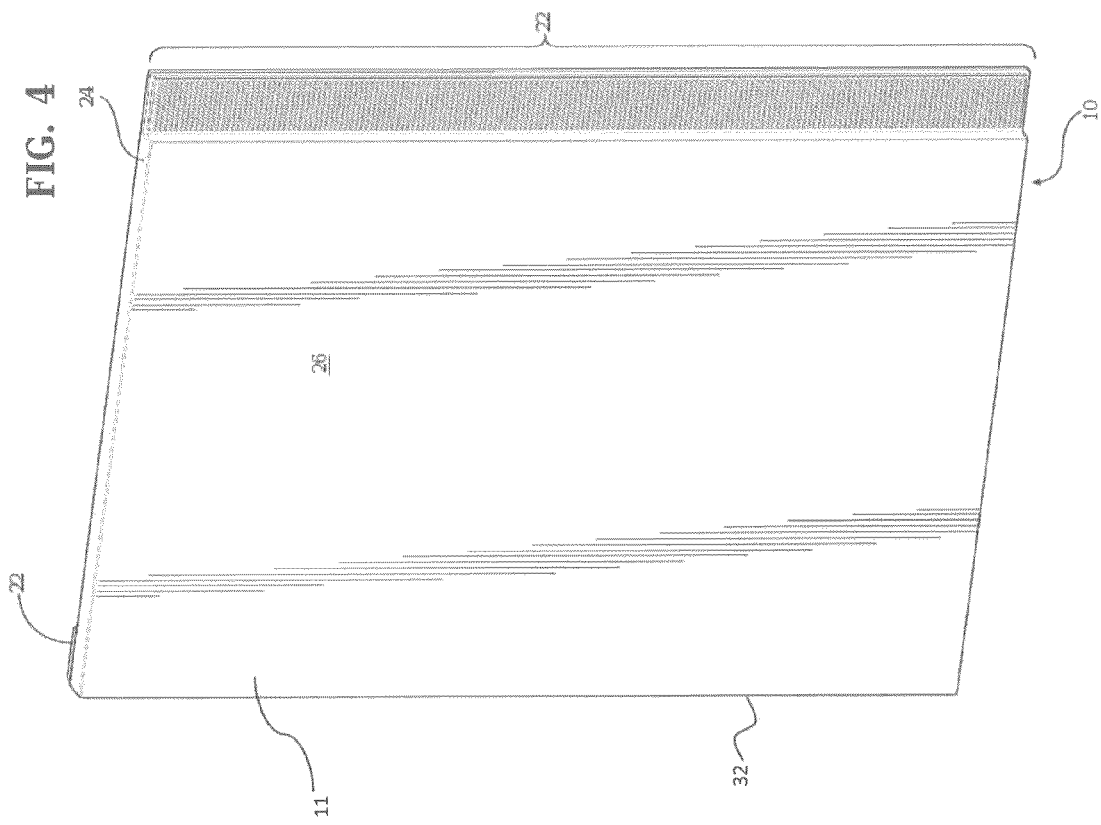

CANOPY ASSEMBLY ORGANIZER

CROSS REFERENCE TO RELATED APPLICATIONS

This application claims the benefit of U.S. Provisional Application No. 61/858,061 entitled CANOPY ASSEMBLY ORGANIZER, filed on Jul. 24, 2013, the entirety of which is incorporated herein by reference.

COPYRIGHT NOTICE

A portion of this disclosure may contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The invention generally relates to canopy or tent enclosures, and more particularly, to a canopy or tent organizer device including features which facilitate non-permanent attachment to a support pole assembly, among other things.

BACKGROUND OF THE INVENTION

There is a lack of products which allow people to secure (e.g., hang, attach, connect, etc.) items within a canopy or tent structure. This leaves individuals in a situation where they would have to use their own ingenuity, creativity, and fabrication abilities, in order to figure out methods of anchoring their canopy, attaching and using shelves, hanging signs, hanging clothes or towels, connecting multiple canopies to each other, providing a safe area for small children to play, and securing personal property such as wallets/purses, mobile phones and car keys.

Therefore, there remains a need for a complete, reliable and simple resolution to the problems of providing for securing items to a canopy, tent and/or the frame thereof.

BRIEF SUMMARY OF THE INVENTION

A canopy organizer for organizing objects on a vertical support is provided. The organizer comprises a body having a first wall and a second wall in contact with each other along at least two of the edges thereof so as to form a tube or pocket. A filling is disposed within the pocket and a flap is attached to the first wall along the length of the organizer body. The flap is configured to interface with a specific area along the opposite edge of the nylon wall upon the body being wrapped around an elongated object. The organizer body includes a fastening mechanism defined on the opposing side of the flap and the second wall configured to come into contact with one another and form a non-permanent engagement when the body is wrapped around the elongated object. The body further includes a plurality of attachment elements attached to the second wall.

BRIEF DESCRIPTION OF THE DRAWINGS

Some of the many advantages of the invention will be readily appreciated as embodiments thereof become better understood from the following detailed description when considered in connection with the accompanying drawings:

FIG. 3 is a view of the outside wall of the invention shown in FIG. 1; and

FIG. 4 is a view of the inside wall of the invention shown in FIG. 1.

Corresponding reference characters indicate corresponding parts throughout the drawings.

DETAILED DESCRIPTION OF THE PREFERRED EMBODIMENT

Figure 1:
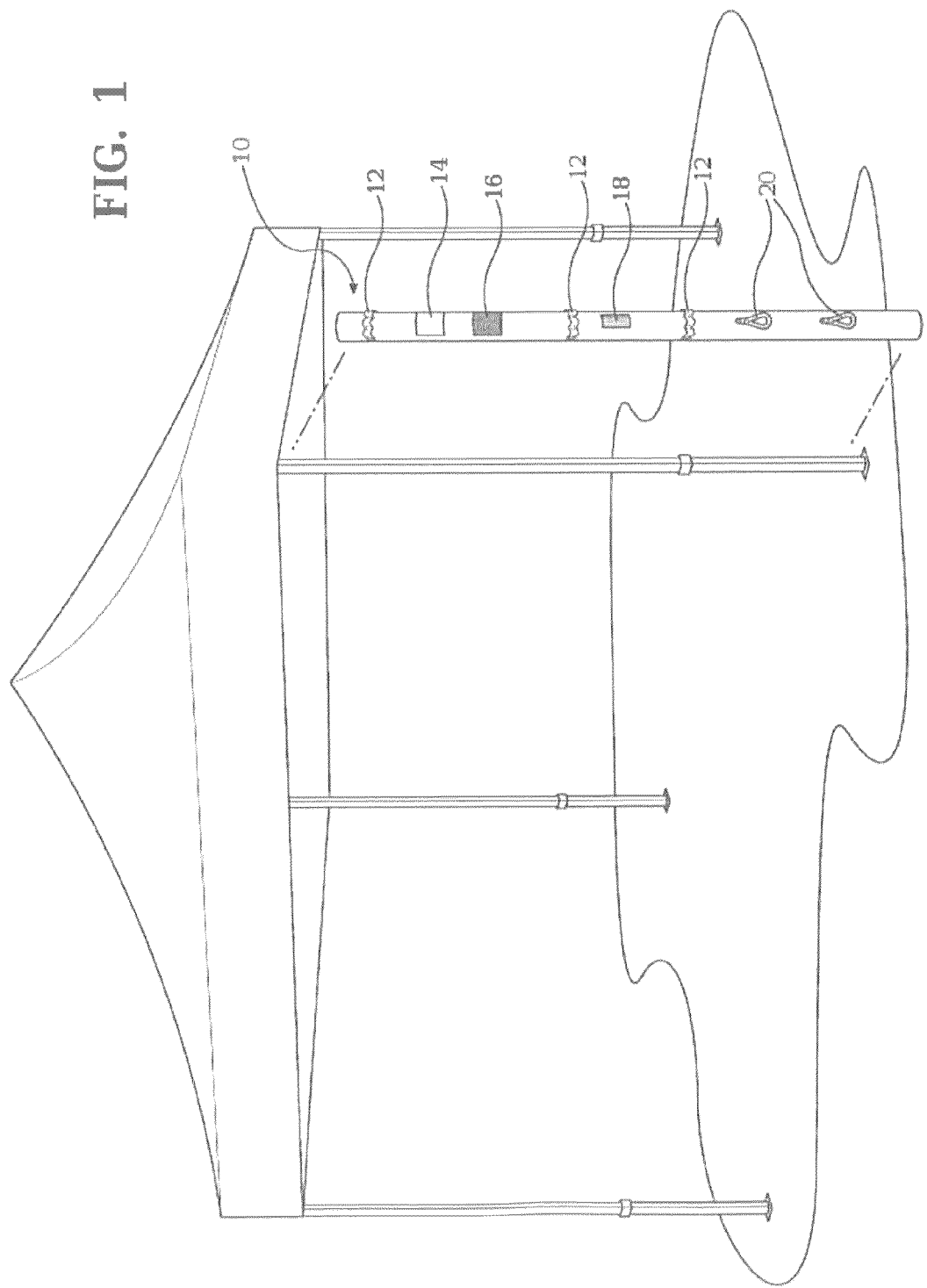
FIG. 1 is a environmental view of an embodiment of the invention.

It should be apparent to those skilled in the art that the following description is provided to illustrate embodiments and features of the invention and should not be construed as limiting the scope of the invention. An exemplary embodiment of the invention is a canopy or tent enclosure organizer as discussed herein which includes, among other things, a vertical attachment mechanism configured to be attached on a support frame member, such as an elongated vertical support frame member used in a canopy or tent and features for facilitating securing various items in an organized manner therein. It should be apparent that the canopy organizer include features which enable it to be removable and re-usable. Exemplary uses would include as an attachment to a canopy at a beach, to a canopy at a "tail gating" party, as an attachment to a tent erected at a park, while observing outdoor sports, at fairs, outdoor markets, or trade shows where vendors set up their own canopies. Because the canopy organizer of the invention provides multiple attachment points and multiple methods of attachment, the types of items and/or secondary products which could be attached to a canopy with the organizer of the invention are effectively limitless.

Referring to FIGS. 1-4, an organizer constructed in accordance with the invention and generally designated by the numeral 10 comprises a body 11 having a first wall 34 and a second wall 26. In this embodiment, first and second walls 34 and 26 are formed of a resilient and flexible fabric material, such as nylon. In this embodiment, walls 34 and 26 contact each other along the edges 32 of body 11 so as to form a pocket 30. A material or filling 24 is disposed in pocket 30. Filling material 24 may be a resilient yet cushioning material. The filling material 24 may be exposed at the top 36 or bottom 38 of the body 11.

Organizer 10 includes a fastening mechanism, which in this embodiment, includes a non-permanent engagement formed by connecting a flap 28 is attached to the first wall 34 along the length of the organizer body 11 from top 36 to bottom 38, with a corresponding engagement portion 40 on the opposing side of body 11. In particular, in this embodiment flap 28 includes an engagement mechanism on its opposing side, that is, with respect to wall 34. In this embodiment fastening mechanism includes a first engagement part 22 positioned on the opposing side of flap 28, which contacts a corresponding engagement part 22 disposed on engagement portion 40 of wall 34, such that the two corresponding parts 22 contact one another and form a non-permanent engagement with each other to secure body 11 around an object, such as a cylindrical or rectangular support frame member as shown particularly in FIG. 2. In this embodiment, parts 22 are Velcro® style hook and loop type corresponding engagements. Wall 26, when body 11 is attached, becomes an inner wall contacting the object and thus providing additional support through contact and frictional forces, while wall 34 is an exposed or outer wall.

It should be understood that the canopy organizer may be constructed of any suitable material and may include one or more attachment elements for attaching a variety of items, such as hooks, Velcro® style hook and loop fastener systems, pockets, loops, buttons, snaps, male-female connectors, screw attachments or any other means for connecting items thereto. It should further be understood that the methods and systems of the invention are described herein in connection with canopies are for illustrative purposes only, as the methods and systems of the invention may be used with other items, such as umbrellas, tents or portable shelters.

Figure 2:
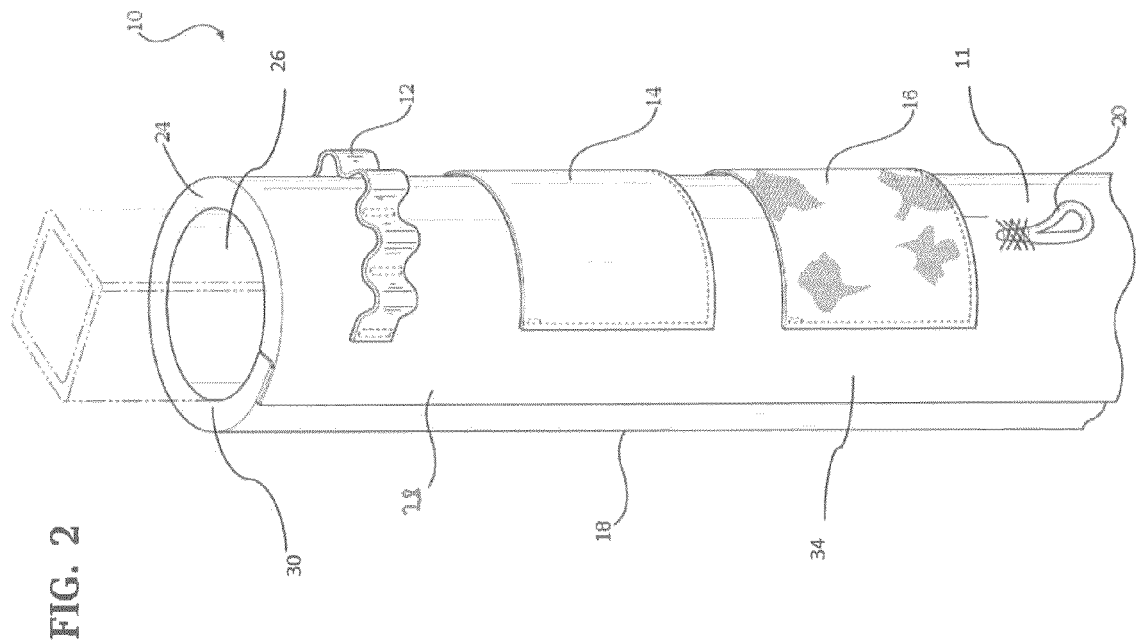
FIG. 2 is a close-up environmental view of the embodiment of the invention shown in FIG. 1.

As show in FIGS. 1, 2 and 3 one of the attachment elements on wall 34 is a pocket 14. Pocket 14 may be formed of a transparent or opaque material and utilized by a user in order to maintain objects within the organizer. Another pocket 16 may be made out of mesh material as shown, for among other reasons, to ensure clear visibility of the object within the pocket as well as additional access for retrieving an object out of the mesh pocket 16 through the mesh material.

In another embodiment, at least one of the attachment elements is a loop such as cord loop 20 shown in this embodiment. Loops may be positioned along the length of the organizer, either horizontally or vertically. Cord loop 20 is made out of elastic or rubber based material and may have cloth or other additional coatings. Cord loops of the invention such as cord loop 20 may be used for the quick access to larger objects that do not require the privacy or security of a pocket as discussed above.

Another embodiment may also include a webbed loop 12. The webbed loop 12 comprises a segment of nylon webbing attached to the outside wall 34. Each webbed loop 12 contains a larger stitched wall area attached to the first wall 34. This allows for additional support in order to anchor a canopy to the ground.

In one embodiment, the filler 24 made be made of a polyester foam in order to provide light-weight support to the organizer 10. In another embodiment, the pocket 30 formed between the first wall 34 and the second wall 26 may also be filled with other materials that may provide support and anchoring weight to the canopy support.

In another embodiment, the foam filler 24 further includes an indentation along the length of the outside wall 34. This ensures that the flap 28 stays flush with the organizer 10 and prevents accidental removal of the organizer 10 from the vertical support.

As illustrated in FIGS. 2 and 3, engagement parts 22 comprises a hook and loop fastener wall, where one side of the wall attached to the flap and the other side attached to the determined area along the opposite edge of the outside wall. However, in other embodiments, engagement parts 22 may also be made of a plurality of male-female connectors, one side of each connector attached to the flap and the other side attached to the determined area along the opposite edge of the outside wall.

In another embodiment, at least one of the attachment elements is a hook and loop surface 18. This surface 18 may be used with compatible attachments in order to keep object off the ground. As an example, a hook sided surface 18 may be used to store tennis balls for sporting activities or for quick reach when having a pet to entertain within the enclosure. Accordingly, at least one of the attachment elements is a male-female connector. Such a connector may also be used with a corresponding connector in order to attached objects to the organizer body 11.

While exemplary systems, methods and applications of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the invention in any way. Accordingly, the invention embraces alternatives, modifications and variations which fall within the spirit and scope of the invention as set forth in the embodiments herein, including the accompanying figures, and equivalents thereto. Furthermore, the size and shape of the organizer shown herein is exemplary and may vary.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A canopy organizer comprising:
   a body extending between a top edge and a bottom edge and between a first side edge and an opposite second side edge, the body including:
   a first fabric wall defining an outer surface of the body;
   a second fabric wall defining an inner surface of the body, both walls in contact with each other along the first and the second side edges so as to form an interior pocket therebetween;
   a filling within the interior pocket formed by the first and second walls;
   a flap attached to the first wall and extending outwardly from the first side edge along a length of the body measured between the top edge and the bottom edge, the flap configured to interface with a determined area defined along the second side edge, the first wall including an indentation formed along the first side edge and extending along the length of the body to facilitate the flap being substantially flush with the outer surface of the body with the flap interfaced with the determined area; and
   at least one fastener positioned along the determined area and configured to hold the organizer around an elongated object; and
   a plurality of attachment elements attached to the outer surface of the body.

2. The canopy organizer, as in claim 1, wherein at least one of the attachment elements is an exterior pocket.

3. The canopy organizer, as in claim 2, wherein the exterior pocket is made out of mesh material.

4. The canopy organizer, as in claim 1, wherein at least one of the attachment elements is a loop.

5. The canopy organizer, as in claim 4, wherein the loop is positioned along the length of the body.

6. The canopy organizer, as in claim 4, wherein the loop is a cord loop.

7. The canopy organizer, as in claim 4, wherein the loop is a webbed loop, the webbed loop comprising a segment of nylon webbing attached to the outer surface of the body.

8. The canopy organizer, as in claim 1, wherein the elongated object includes a support leg of a canopy, the filling including weighted material to facilitate anchoring the canopy to ground.

9. The canopy organizer, as in claim 1, wherein the at least one fastener comprises a hook and loop fastener wall, one side of the fastener wall attached to the flap and the other side of the fastener attached to the determined area.

10. The canopy organizer, as in claim 1, wherein the at least one fastener comprises a plurality of male-female connectors, one side of each connector attached to the flap and the other side of the connector attached to the determined area.

11. The canopy organizer, as in claim 1, wherein the filling is a foam material.

12. The canopy organizer, as in claim 1, wherein at least one of the attachment elements is a hook and loop wall.

13. The canopy organizer, as in claim 1, wherein at least one of the attachment elements is a male-female connector.

* * * * *